Oct. 20, 1936.   H. FORD   2,057,774
CLUTCH AND BRAKE CONTROLLING DEVICE
Filed March 1, 1932   3 Sheets-Sheet 1
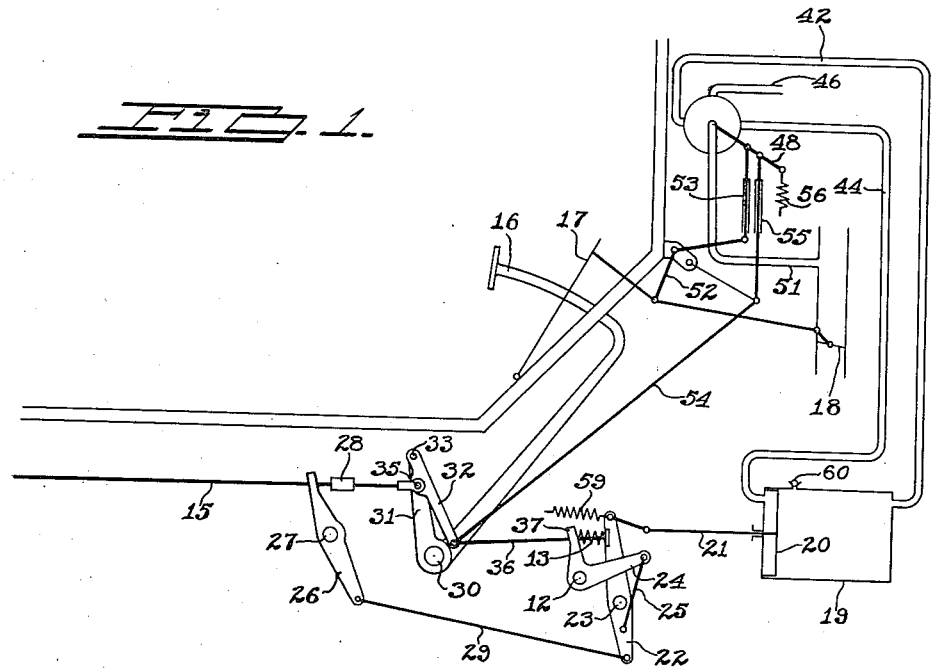
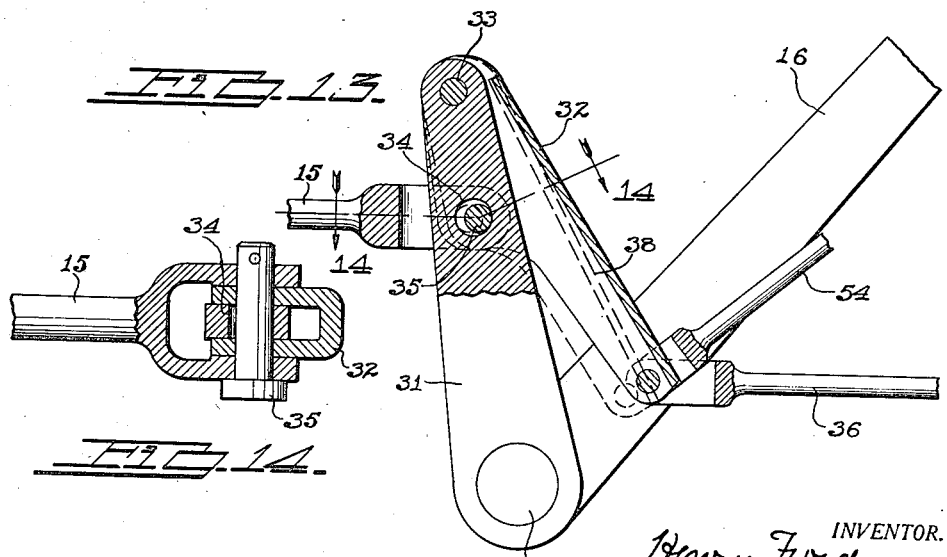
INVENTOR.
Henry Ford.
BY
ATTORNEY.

Oct. 20, 1936.                H. FORD                 2,057,774
                   CLUTCH AND BRAKE CONTROLLING DEVICE
                      Filed March 1, 1932      3 Sheets-Sheet 2
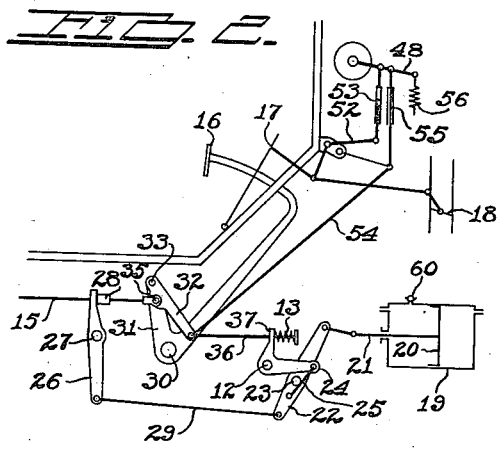
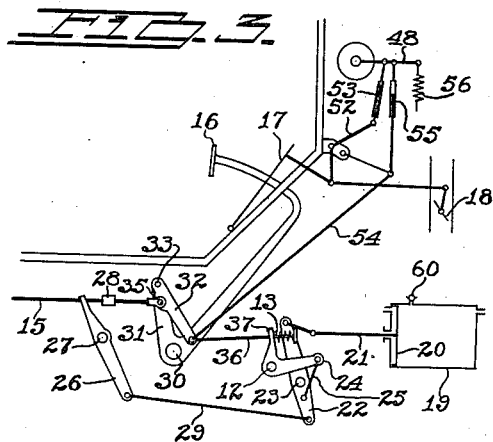
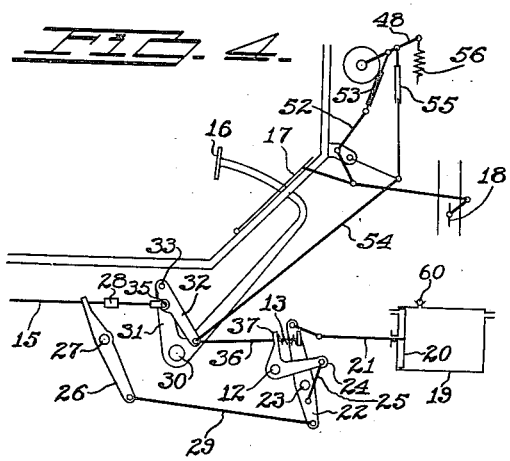
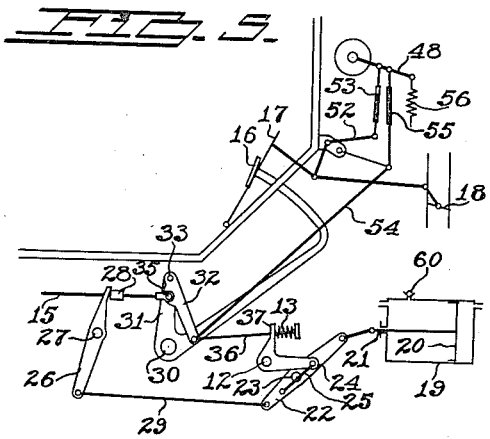
INVENTOR.
Henry Ford.
BY
Chs. Davis,
ATTORNEY.

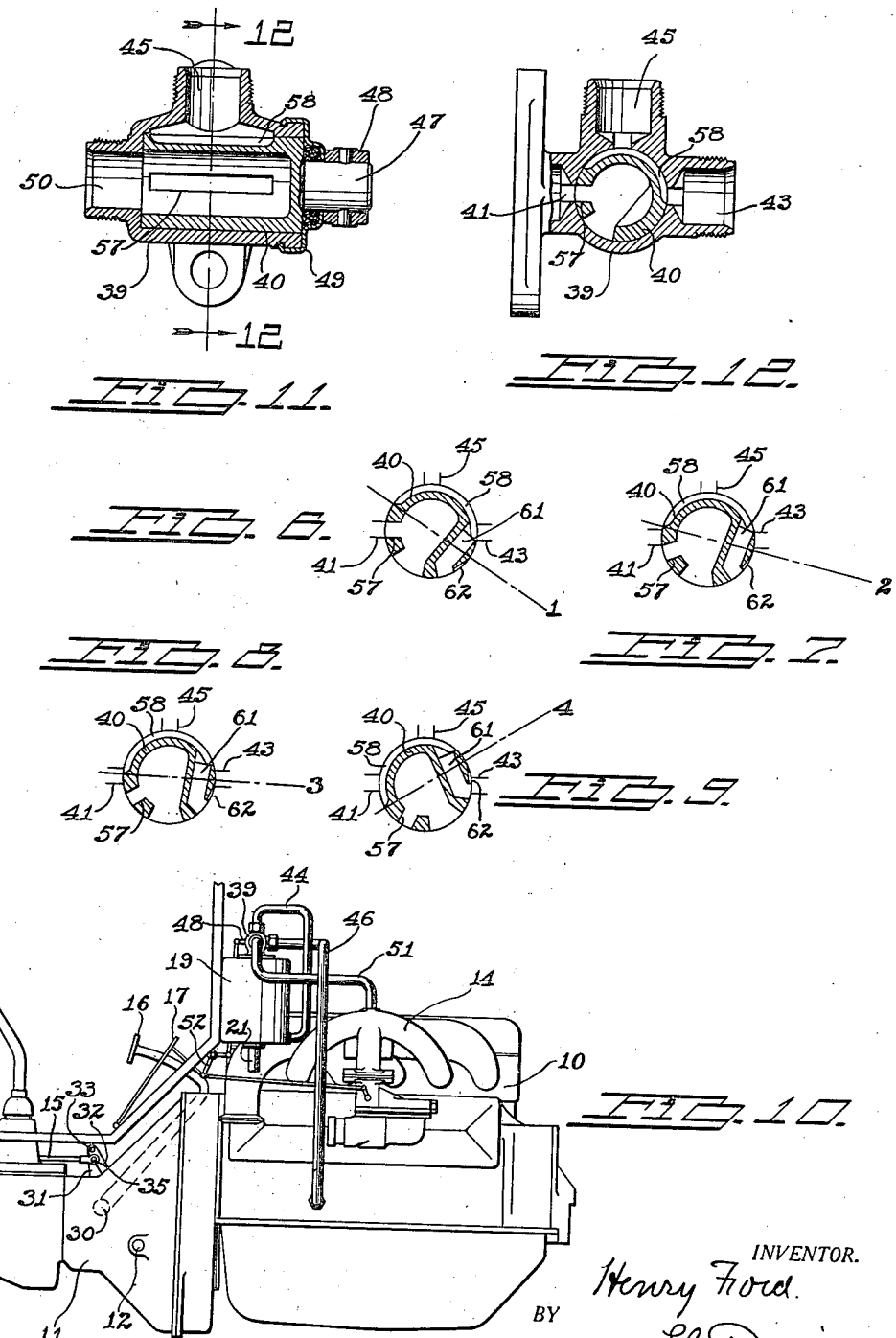

Patented Oct. 20, 1936

2,057,774

UNITED STATES PATENT OFFICE 2,057,774

CLUTCH AND BRAKE CONTROLLING DEVICE

Henry Ford, Dearborn, Mich., assignor to Ford Motor Company, Dearborn, Mich., a corporation of Delaware Application March 1, 1932, Serial No. 596,058

10 Claims. (Cl. 192—.01)

The object of my invention is to provide an automotive vehicle wherein both the clutch and brake will be power operated. In this structure, the clutch may be automatically disengaged when desired by the operator and further, the brake may be automatically applied by lightly pressing a brake actuating pedal. The source of power used to operate this mechanism is the vacuum in the intake manifold of the engine, although fluid pressure from any other source may be readily used if desired and still incorporate the advantageous features of this construction.

Heretofore, both vacuum operated clutches and vacuum operated brakes have been employed but in all cases with which the applicant is familiar these devices have been independent of each other and invariably required a separate mechanism for each device. A typical clutch installation of this kind consists of a cylinder having a diaphragm or piston therein, which piston is actuated by the intake manifold vacuum through a suitable valve. This valve is connected with the accelerator pedal and the piston is connected to the engine clutch shaft, whereby the clutch is automatically disengaged when the accelerator pedal is released. In most of these installations the compression end of the cylinder is provided with a check valve so that a dashpot effect is obtained whereby the return of the clutch can be nicely regulated to engage smoothly and without jerk.

Now in those cars having vacuum operated brakes, a second cylinder and piston is provided which is connected to operate the brakes of the car. A second valve is also provided which is actuated by the conventional brake pedal so that the brakes may be operatively applied. It will be seen that with this conventional arrangement two separate valves, pistons and cylinders must be provided and that the piping which connects these several units must also be duplicated.

In view of these aforementioned requirements, the accomplishment and purpose of this invention is to provide a single cylinder and piston which is connected to the source of vacuum by a single valve and which valve is actuated by either the accelerator or brake pedal or both, to obtain the disengagement of the clutch and if desired the subsequent application of the brakes. The use of a single cylinder, piston, valve, and piping system, of course, results in a reduced cost of manufacture and also results in more reliable operation. I am enabled to use this single cylinder and piston for the reason that I connect the piston to both the clutch and brake so that movement thereof through the first portion of its stroke disengages the clutch and further movement thereof applies the brake.

Still further, my invention incorporates a novel feature wherein the compression end of the cylinder forms a dashpot which controls the speed at which the clutch engages. This dashpot differs from those heretofore provided in that the metering outlet therefor is regulated by the foot accelerator pedal. Thus, when the accelerator is pressed lightly the clutch will engage very slowly but when a quick get-away is desired, the accelerator may be further depressed which will allow the clutch to engage very rapidly.

Further, my device is so arranged that if for any reason it is desirable to manually operate the clutch or brake by their respective foot pedals, such is permissible. It will be understood that in case the source of vacuum or power fails for any reason, the actuation of the same controls which normally operate the control valve will then mechanically apply the brake independently of my power mechanism. This is a desirable safety feature in all power operated brakes.

Several of the individual elements of this invention are believed to be of novel construction, among which are: the rotary valve for controlling the device; the mechanism whereby the valve is operated by stressing the brake mechanism; and the arrangement whereby the working parts of the device are lubricated.

With these and other objects in view, my invention consists in the arrangement, construction and combination of the various parts of my improved device, as described in the specification, claimed in my claims, and illustrated in the accompanying drawings, in which:

Figure 1 is a view illustrating diagrammatically the position of the several parts of the device when the engine is stopped.

Figure 2 shows a diagrammatic view illustrating the position assumed by the aforementioned elements after the engine has been started and is idling.

Figure 3 shows a similar view illustrating the position of the various parts when the accelerator is depressed so as to engage the clutch.

Figure 4 shows the position of the accelerator fully depressed.

Figure 5 shows a similar view illustrating the position of the parts when the brake pedal is actuated, whereby the clutch is thrown out and the brake is applied.

Figures 6, 7, 8, and 9 diagrammatically illustrate the positions assumed by my valve when the parts are in the positions shown by Figures 1, 2, 3, and 4, respectively.

Figure 10 shows a side view of an engine having my device installed thereon, the operating cylinder being located on the vehicle dash, instead of in the position shown in Figure 1.

Figure 11 shows a central sectional view through my improved valve.

Figure 12 shows a sectional view taken on the line 12—12 of Figure 11.

Figure 13 illustrates the mechanism whereby my valve is actuated when the brake pedal is depressed, and Figure 14 shows a sectional view taken on the line 14—14 of Figure 13.

Referring to the accompanying drawings, I have used the reference numeral 10 to indicate generally an automotive engine having a transmission and clutch housing 11 secured to the rear portion thereof in the conventional manner. An engine clutch is disposed in the housing 11 which clutch is actuated by oscillating a shaft 12, the movement thereof in a clockwise direction in Figure 10 effecting the disengagement of the clutch, while its movement in the opposite direction allows the clutch to engage. A spring is disposed within the clutch housing which resiliently urges the clutch to its engaged position so that in order to disengage the clutch the pressure of this spring must be overcome.

The engine 10 is provided with an intake manifold 14 which provides the vacuum to operate this device, this manifold having a suitable opening therein whereby a connection may be made with my control valve. Further, I have shown a brake rod 15 which, when moved forwardly, applies the brakes of the vehicle and which rod is connected to a conventional brake pedal 16, the operation of which manually applies the brakes. The vehicle further has an accelerator pedal 17 mounted in the ordinary manner therein which pedal is connected to a butterfly valve 18 in the engine carburetor so that when the accelerator is depressed, the valve 18 is opened to speed up the engine. Each of the aforementioned elements is used in conventional automobiles and these elements constitute no part of my invention except in so far as they cooperate with the other parts of my device to produce a new function.

The novel parts of my device may be seen by referring to Figure 1, wherein I have provided a cylinder 19 having a piston 20 therein, each end of this cylinder being closed by a suitable cylinder head which heads each have a pipe extending therefrom to a valve mechanism later to be described. The piston 20 is secured to a piston rod 21, the outer end of this rod being connected to one end of a beam 22 whereby reciprocation of this piston oscillates the beam 22 around its fulcrum 23. The clutch shaft 12 is provided with an arm 24 which is connected to the beam 22 by means of a link 25, this link being so disposed that movement of the piston, from the position shown in Figure 1, through about one-half its stroke actuates the arm 24 to disengage the clutch and movement of this piston through the remainder of the stroke allows the link 25 to pass over the center of the fulcrum 23 thereby holding the clutch in its disengaged position.

Now in order to operate the brake rod 15 by means of this same piston, I have provided a brake beam 26, pivoted at 27, with its upper end positioned so as to coact with a stop 28 secured on the rod 15. The lower end of the beam 26 is connected through a compression link 29 with the lower end of the beam 22, these parts being so proportioned that movement of the piston 20 from the position shown in Figure 1 to the opposite end of the cylinder will progressively throw out the engine clutch and then apply the brake. This is accomplished by positioning the stop 28 so that the upper end of the beam 26 coacts therewith about the time the link 25 is passing over the center of the fulcrum 23 so that further movement of the beam 22 will cause the stop 28 to be drawn forwardly thereby tensioning the brake rod 15 and applying the brakes.

The foregoing describes the mechanism whereby the brake is power operated, however, I have allowed the brake rod 15 to extend forwardly from the beam 26 to position whereby it may be directly actuated by the brake pedal 16. It will be noted that the pedal 16 is fulcrumed at 30 and that an integral arm 31 extends upwardly from this pivot. The forward end of the rod 15 is not directly connected to the arm 31 but is connected thereto through a valve actuating member 32, this member being so arranged that upon depression of the pedal 16 the member 32 will be moved through a predetermined stroke before the brake rod 15 is actuated.

It will be noted from Figures 13 and 14 that the upper end of the arm 31 is provided with a pivot pin 33 and that the member 32 is formed in a channel shape so as to fit over the arm and be pivotally secured thereto by the pin 33. Between the fulcrum 30 and pin 33 a clearance opening 34 is provided in the arm 31 and a pin 35 is loosely fitted in this opening 34 and extends therethrough, which pin is snugly fitted in suitable openings in the operating member 32. Thus, a limited oscillation of the operating member 32 around the fulcrum 33 is permitted by the clearance between the opening 34 and the pin 35. The forward end of the rod 15 is forked and the pin 35 snugly extends therethrough so that there is no play between the member 32 and rod 15. The free end of the operating member 32 extends downwardly and forwardly from the arm 31 and is connected to a rod 36 which extends forwardly through an arm 37, this arm being formed integrally with the arm 24 and, of course, connected to the clutch shaft 12. The forward end of the rod 36 is not rigidly connected to the arm 37 but extends therethrough and a relatively heavy compression spring 13 is interposed between the end of the rod and the arm 37. This spring is so proportioned that when the clutch is engaged, as shown in Figure 1, little or no tension will be placed on the rod 36.

The operation of this portion of the device occurs when the pedal 16 is depressed at which time the arm 31 is moved forwardly through a few degrees while the brake rod 15 remains stationary. The operating member 32 is thus moved to the position, shown by dotted line 38, wherein its free end is drawn rearwardly. Further movement of the pedal 16 simply oscillates the parts around the fulcrum 30 in these relative positions, the stroke of the member 32 being controlled by the clearance between the pin 35 and opening 34. It will thus be seen that should the power mechanism fail for any reason, the actuation of the pedal 16 will directly apply the brakes. Normally the power mechanism operates with sufficient speed so that the pedal 16 simply follows the movement of the rod 15 and only sufficient pressure need be placed on the pedal to compress the spring 13.

and hold the operating member 32 in its operative position. It may be well to mention here that if the pedal 16 is only partially depressed, the power mechanism will move the rod 15 sufficiently to throw the member 32 forwardly to its inoperative position to thereby shut off the vacuum and hold the brake rod with the corresponding force. Thus, moving the brake pedal to any further position will automatically apply a further pressure on the brake rod.

The foregoing has been described to show what is required of the power mechanism in operating the brakes to thus more clearly illustrate the functions of the valve which controls this mechanism. This valve consists of a housing 39 having a cylindrical bore therein in which a valve rotor 40 is rotatably mounted. It will be noted from Figures 11 and 12 that the housing 39 is provided with three ports around the periphery of the rotor 40, two of these ports being opposite each other and the third in an intermediate position. One of these ports, designated 41, is connected through a tube 42 with the suction end of the cylinder 19, while the opposite port, designated 43, is connected through a tube 44 with the opopsite end of the cylinder 19. The intermediate port, designated by numeral 45, is connected by a tube 46 with the crankcase of the engine 10 so that air drawn through this tube will be drawn from the crankcase whereby oil saturated air will be drawn therethrough, the purpose of which is to lubricate the valve and working parts of the device.

It will be noted that the valve 40 is constructed in the form of an open-ended cup with the bottom thereof having a shaft 47 extending therefrom to which an arm 48 is secured. A cap 49 is secured over this end of the valve and is fastened to the body 39 to secure the valve in position. From Figure 11 it will be seen that the housing 39 is provided with an axial port 50 which is in line with the open end of the valve 40 and this port is connected by means of a tube 51 with the intake manifold 14 of the engine. Thus, the center portion of the valve is under a vacuum at all times when the engine is running. The valve rotor 40 is provided with certain openings therethrough whereby the several ports may be selectively connected together to obtain various operating conditions for the several positions of the valve.

Before describing the arrangement of the openings in this valve, it may be well to show the means by which the valve is operated so that the functions of the valve will be more apparent. The accelerator 17 is connected to one arm of a bell crank lever 52, which is pivoted to the dash of the vehicle and the other arm of this lever is connected to the arm 48 through a slip joint connection 53. It will be noted that the joint 53 is so arranged that upon depression of the accelerator 17, the arm 48 will be raised but that the arm 48 may be raised by other means independently of the accelerator. The valve actuating member 32 constitutes this other means. A rod 54 extends from the valve actuating member 32 upwardly to the arm 48 which rod is likewise connected to this arm through a second slip joint 55 whereby the upward movement of the rod 54 will raise the valve arm. Consequently the valve arm 48 may be raised by either the upward movement of the rod 54 or the depression of the accelerator 17 and the reverse movement of either of these members will not tend to return the valve. In order that this valve arm may be returned, I have provided a relatively light spring 56 secured to the end of the arm 48, which spring urges this arm downwardly against either of the slip joints, whereby the position of this arm is determined by whichever of the slip joints is in the uppermost position.

Referring to Figure 1, the position of the mechanism when the vehicle is at rest is shown. Under these conditions the accelerator pedal 17 is in its upward position, the brake pedal is released, and the engine clutch is engaged, there being no engine vacuum to hold the piston 20 against the urging of a spring 59. The clutch being engaged, the spring 13 is not tensioning the rod 36 so that the valve operating member 32 is in the position shown by the dotted lines 38 in Figure 13. Both the slip joints 53 and 55 are thus in their lowermost positions so that the spring 56 may move the arm 48 downwardly to its lowermost position, or that shown by the dotted line 1 in Figure 6.

When the valve is in this position, a slot 57 extending through the rotor 40 forms a passageway from the interior of the rotor to the port 41 whereby a connection is established to the suction end of the cylinder 19. A portion of the periphery of the rotor is relieved at 58, this relieved portion extending almost 180 degrees around the rotor so that when the rotor is in this position the ports 43 and 45 are in communication with each other, thereby allowing the tube 44 to draw in air through the port 43, relief 58, port 45 and tube 46.

As soon as the engine has been started, a vacuum is produced in the intake manifold which, operating through the valve in position 1, draws the piston 20 and other mechanism to the position shown in Figure 2. The piston 20 is now in the center of the cylinder 19 having thrown out the engine clutch. At this time the spring 13 tensions the rod 36 because of the oscillation of the arm 37, which draws the valve operating member 32 and rod 54 forwardly to thereby push the slip joint 55 upwardly through the amount allowed by the stroke of the valve operating member 32. The valve rotor is thus moved to position 2, or that shown in Figure 7. At this time the port 41 is just about cut off from the vacuum by the oscillation of the slot 57 so that further movement of the piston does not occur. If leakage through the valve tends to move the piston still further, then the relief portion 58 comes in line with the port 41 thereby allowing air to enter from the port 45 to relieve the vacuum and stop the further movement of the piston. Consequently, the piston reaches a balance at the center of the cylinder and remains there as long as the engine is operating and the valve remains in this position.

If it is now desired to operate the car, the accelerator is depressed to the position in Figure 3, the slip joint 53 at this time pushing the arm 48 still further upwardly to the position shown by dotted line 3 in Figure 8. The valve rotor 40 will be rotated to position wherein the port 41 is in connection with the port 45 through the relief 58, thereby relieving all vacuum in the suction end of the cylinder 19 and allowing the piston 20 to be drawn by the action of the spring 59 toward the outer end of the cylinder 19 to allow the engagement of the engine clutch. However, at this time the relief 58 has been moved around past the port 43 so that the air in the compression end of the cylinder cannot escape therethrough to thus prevent the return of the piston. I have provided other means, nevertheless, whereby the air may first rapidly escape from the compression end of the cylinder and then gradually be restricted so as to softly engage the clutch.

A check valve 60 is disposed in the cylinder 19 in position spaced from the compression end thereof so that upon movement of the piston, from the position shown in Figure 2 to that shown in Figure 3, the air from the cylinder may be readily forced out through this valve 60 until the piston has covered this valve. Further movement of the piston is resisted, but not totally prevented for I have provided a passageway in the rotor which slowly allows the air to escape. A drilled port 61 extends from the relief 58 through the rotor to a position just beyond the port 43 where it projects through the periphery of the rotor. This port is at no time in communication with the interior of the valve but simply forms a passageway from the relief 58 to the opposite side of the valve. A small V-slot 62 extends from the port 61 backwardly toward the relief 58 so that when the valve is in the position shown in Figure 8, the air from the compression end of the cylinder 19 may be metered through this V-slot into the port 61 from which it flows freely through the relief 58, port 41 and then to the suction end of the cylinder thereby allowing the clutch to gradually engage.

There are, of course, times when it is desirable to have the clutch quickly engage, as when a quick get-away is desired, and at such times this quick engagement may be accomplished by pressing the accelerator downwardly to its full or nearly full throttle position. This position is shown in Figure 4 wherein it will be seen that the slip joint 53 has moved the valve arm 48 still further upwardly against the action of the spring 56 to the position shown by dotted line 4 in Figure 9. At this time, the ports 41 and 45 are in direct connection with each other through the relief 58 and the port 43 is likewise connected to these other two ports through the port 61. There is only a partial restriction offered by the port 61 so the air may quite rapidly escape from the compression side of the cylinder 19 to the suction side thereof, thereby allowing the piston to quite rapidly move outwardly and cause the engagement of the clutch. The size of the port 61 can be correctly proportioned to engage the clutch at the maximum desirable speed.

If now it is desired to apply the brake, the accelerator is released and the brake pedal is depressed, as shown in Figure 5, sufficiently to move the valve actuating member 32 to the position shown by dotted lines 38 thereby drawing the rod 54 downwardly which allows the valve to assume the position shown in Figure 6. The several control members are at this time in the same position as that shown in Figure 1 with the exception that when the car is at rest, as shown in Figure 1, the valve operating member 32 is in its dotted line position because the spring 56 urges the rod 54 downwardly, the heavier spring 13 not being at this time in position to counteract the force of the spring 56. The valve mechanism, when the brake pedal is depressed, is in this same position but the difference is that the member 32 is now held in its dotted line position by the tension of the brake rod 15 against the torque of the spring 13. In this position, the suction side of the cylinder 19 is in communication with the intake manifold which draws the piston 20 from the position shown in Figure 2 to apply the brakes, as shown in Figure 5. In this latter figure, it will be seen that as the brake beam 26 moves the brake rod 15, the tendency is to move the valve operating member 32 to its disengaged position. As long as the brake pedal follows up the movement of the rod 15, this does not occur, but whenever forward movement of the pedal is stopped, then the member 32 is moved to its inoperative position whereby the rod 54 is pushed upwardly to thereby move the arm 48 through the slip joint 55 to position 2, as shown in Figure 7. In this position the vacuum is cut off from the port 41 to thereby prevent further movement of the piston 20 but the brake, nevertheless, is held in this position by the vacuum in the cylinder until the brake pedal is released. The releasing of the brake pedal allows the valve to move upwardly to the position shown in Figure 8 whereby the two sides of the piston are in communication with each other and thereby allows the piston to return and consequently releases the brake.

In this specification, many of the various parts have been shown diagrammatically and many of these parts have been shown out of their true proportions to better illustrate their construction. For instance, in the actual construction employed, the cylinder 19 is placed on the dash of the vehicle shown in Figure 10, the fulcrum 23 is axially aligned with the clutch shaft 12 so that the beam 22 operates the clutch shaft through a simple lug connection. Still further, the fulcrums 27 and 30 are aligned so that the brake pedal may be readily operated. However, if such a construction was attempted to be illustrated, the drawings would be unduly complicated and consequently these elements have been placed separately to better illustrate the actuation of the parts.

Among the many advantages arising from the use of this device are:

1. A single cylinder, piston, valve, and piping system accomplishes the power actuation of both the brake and the clutch, which actuation formerly required the use of duplicate mechanisms.

2. Further, in this device the speed at which the clutch engages is automatically regulated by the position of the accelerator to allow slow engagement thereof when desired, as in parking the car. The provision of an air vent in the compression cylinder allows a quick movement of the clutch prior to engagement to make the clutch more responsive.

3. Still further, the hook-up is so arranged that if for any reason the source of power fails, then the actuation of the pedal which normally operates only the control valve will positively apply the brakes, and 4. The arrangement of a valve actuating member between the foot pedal and the point at which the power is applied, whereby manually stressing the brake mechanism will control the application of the power, results in an application of power which is directly proportional to the movement of the pedal, irrespective of the intensity of the operating fluid.

It will be understood that, although I have shown a structure which utilizes vacuum as a source of power, that the novel features disclosed herein will apply equally well to any type of fluid operated device.

Some changes may be made in the arrangement, construction, and combination of the various parts of my improved device without departing from the spirit of my invention, and it is my intention to cover by my claims such changes as may reasonably be included within the scope thereof.

I claim as my invention:

1. In a device adapted to operate the clutch and brake of a vehicle, a fluid operated piston connected to said clutch and brake so that movement of the piston through a portion of its stroke disengages the clutch and further movement thereof applies the brake, an accelerator, means operated by said accelerator for effecting only said clutch disengagement, a brake control, and means operated by said brake control for effecting the full movement of said piston to apply the brakes.

2. In a device adapted to operate the clutch and brake of a vehicle, a vacuum operated piston connected to said clutch and brake so that movement of the piston through a portion of its stroke disengages the clutch and further movement thereof applies the brake, an accelerator, means operated by said accelerator for effecting only said clutch disengagement, a brake control, and means operated by said brake control for effecting the full movement of said piston to apply the brakes.

3. In a device adapted to operate the clutch and brake of a vehicle, a fluid operated piston connected to said clutch and brake so that movement of the piston through a portion of its stroke disengages the clutch and further movement thereof applies the brake, an accelerator, means operated by the movement of the vehicle accelerator to its idling position for effecting only said clutch disengagement, a brake control, and means operated by said brake control for effecting the full movement of said piston to apply the vehicle brakes.

4. In a device adapted to operate the clutch and brake of a vehicle, a fluid operated piston connected to said clutch and brake so that movement of the piston through a portion of its stroke disengages the clutch and further movement thereof applies the brake, an accelerator, means operated by said accelerator for effecting only said clutch disengagement, a brake control, and means operated by said brake control for progressively effecting first the disengagement of said clutch and then the application of said brake.

5. In a device adapted to operate the clutch and brake of a vehicle, a fluid operated piston connected to said clutch and brake so that movement of the piston through a portion of its stroke disengages the clutch and further movement thereof applies the brake, an accelerator pedal, a valve, means connecting said valve to the accelerator pedal whereby actuation of said pedal will cause said clutch to engage, and a mechanism disposed in the linkage of said brakes adapted to operate said valve when the linkage is stressed to manually apply the brakes, thus effecting the further movement of said piston and the power application of said brakes.

6. In a device adapted to operate the clutch and brake of a vehicle, a vacuum operated piston connected to said clutch and brake so that movement of the piston through a portion of its stroke disengages the clutch and further movement thereof applies the brake, an accelerator pedal, a valve, means connecting said valve to the accelerator pedal whereby releasing said pedal will cause said piston to disengage the clutch linkage for the vehicle brake, and a valve operating mechanism disposed in said linkage adapted to operate said valve and effect said further brake-applying movement when said linkage is tensioned during the manual application of the brake.

7. In a device adapted to operate the clutch and brake of a motor vehicle, a vacuum operated piston connected to said clutch and brake so that movement of the piston through a portion of its stroke disengages the clutch and further movement thereof applies the brake, a valve controlling the vacuum to said piston, means for manually opening said valve to position where the piston is placed under a vacuum to thus disengage the clutch, said clutch having means associated therewith whereby said valve is gradually closed when the clutch is disengaged so that the vacuum on the piston will exactly counteract the clutch engaging pressure and retain the clutch in its disengaged position without a positive stop for the disengaging mechanism, and manually operable means for actuating said valve independently of said clutch and first mentioned means to thereby effect the application of said brake.

8. In a device adapted to operate the clutch and brake of a vehicle, a vacuum operated piston connected to said clutch and brake so that movement of the piston through a portion of its stroke releases the clutch and further movement thereof applies the brake, a valve controlling the vacuum to said piston, an accelerator connected to open said valve to position where the piston is placed under vacuum to thus disengage the clutch, said clutch having resilient means associated therewith whereby said valve is gradually closed when the clutch is disengaged, whereby the vacuum on said piston will exactly counteract the clutch engaging pressure to stop and retain said clutch in an intermediate position, and a brake pedal connected to open said valve against said resilient means to thereby apply the brake independently of said clutch resilient means.

9. In a device adapted to operate the clutch and brake of a vehicle, a vacuum operated piston connected to said clutch and brake so that movement of the piston through a portion of its stroke disengages the clutch and further movement thereof applies the brake, a valve controlling the vacuum to said piston, linkage connecting the accelerator pedal to said valve whereby releasing said accelerator pedal will allow the valve to move to position wherein the piston is placed under vacuum to thus disengage the clutch, said clutch having control means associated therewith whereby said valve is resiliently closed when the clutch is disengaged to thereby exactly counteract the clutch engaging pressure to stop and retain the clutch in its disengaged position, and means operated by manually stressing the brake linkage for returning said valve against the action of said resilient means to position where the vacuum acts upon said piston to thus apply the brake.

10. In combination with a vehicle having a clutch and brakes, a power actuated device coupled with said clutch and brakes operable to disengage and apply them respectively, accelerator controlled means for rendering the power device operative to disengage the clutch, and independently operable manual means for further rendering said power device operative to apply the brakes, said power device being operable to automatically retain the clutch disengaged during application of the brakes.

HENRY FORD.